(12) United States Patent
Cole

(10) Patent No.: US 11,248,981 B2
(45) Date of Patent: Feb. 15, 2022

(54) METHODS AND APPARATUS TO DETECT LEAKS BASED ON TEMPERATURE DATA

(71) Applicant: Itron, Inc., Liberty Lake, WA (US)

(72) Inventor: Philip Alan Cole, Stow, MA (US)

(73) Assignee: Itron, Inc., Liberty Lake, WA (US)

( * ) Notice: Subject to any disclaimer, the term of this patent is extended or adjusted under 35 U.S.C. 154(b) by 131 days.

(21) Appl. No.: 15/819,677

(22) Filed: Nov. 21, 2017

(65) Prior Publication Data
US 2019/0154535 A1 May 23, 2019

(51) Int. Cl.
*G01M 3/24* (2006.01)
*G01M 3/00* (2006.01)

(52) U.S. Cl.
CPC ............. *G01M 3/002* (2013.01); *G01M 3/24* (2013.01)

(58) Field of Classification Search
CPC .................................. G01M 3/002; G01M 3/24
See application file for complete search history.

(56) References Cited

U.S. PATENT DOCUMENTS

| | | | |
|---|---|---|---|
| 5,038,614 A | 8/1991 | Bseisu et al. | |
| 5,974,862 A | 11/1999 | Lander et al. | |
| 6,453,247 B1 | 9/2002 | Hunaidi | |
| 6,567,006 B1 | 5/2003 | Lander et al. | |
| 6,957,157 B2 | 10/2005 | Lander | |
| 7,705,721 B1 * | 4/2010 | Chen | G06F 11/30 340/518 |
| 8,643,716 B1 * | 2/2014 | Kalokitis | G01M 3/002 340/588 |
| 10,359,335 B2 | 7/2019 | Cole | |
| 2001/0045129 A1 * | 11/2001 | Williams | G01M 3/24 73/592 |
| 2006/0036404 A1 | 2/2006 | Wiklund et al. | |
| 2006/0225507 A1 * | 10/2006 | Paulson | F17D 5/06 73/592 |

(Continued)

FOREIGN PATENT DOCUMENTS

| | | | |
|---|---|---|---|
| CN | 102563361 A | * | 7/2012 |
| FR | 2910619 A1 | | 6/2008 |
| WO | 2017106490 A1 | | 6/2017 |

OTHER PUBLICATIONS

Lee, "An Evaluation of Microbial and Chemical Contamination Sources Related to the Deterioration of Tap Water Quality in the Household Water Supply System," International Journal of Environmental Research and Public Health, Sep. 2013; 10(9): 4143-4160, [https://www.ncbi.nlm.nih.gov/pmc/articles/PMC3799508], published online Sep. 6, 2013, 19 pages.

(Continued)

*Primary Examiner* — Eyob Hagos
(74) *Attorney, Agent, or Firm* — Lee & Hayes, P.C.

(57) ABSTRACT

Methods and apparatus to detect leaks based on temperature data are disclosed. A disclosed apparatus includes a storage device to store spectral recording data associated with spectral recordings measured by an acoustic sensor of a node of a utility distribution system, and temperature data associated with the utility distribution system. The disclosed apparatus also includes a processor to select a portion of the spectral recording data based on the temperature data, where the processor is to generate a data packet based on the portion, and a transceiver to transmit the data packet.

24 Claims, 9 Drawing Sheets

(56) References Cited

U.S. PATENT DOCUMENTS

| | | | |
|---|---|---|---|
| 2010/0106434 A1* | 4/2010 | Killion | G01M 3/002 |
| | | | 702/51 |
| 2011/0093220 A1* | 4/2011 | Yang | G01M 3/36 |
| | | | 702/51 |
| 2011/0301882 A1 | 12/2011 | Andersen | |
| 2013/0036796 A1* | 2/2013 | Fleury, Jr. | G01M 3/00 |
| | | | 73/40.5 R |
| 2013/0101127 A1 | 4/2013 | Buchmann | |
| 2014/0121999 A1* | 5/2014 | Bracken | G01M 3/243 |
| | | | 702/51 |
| 2014/0290343 A1* | 10/2014 | Kulkarni | G01M 3/002 |
| | | | 73/40.5 R |
| 2015/0052979 A1 | 2/2015 | Cho et al. | |
| 2015/0330863 A1 | 11/2015 | Dotan et al. | |
| 2018/0094775 A1* | 4/2018 | Jacobson | G01M 3/2807 |
| 2018/0172546 A1* | 6/2018 | Calzavara | G01M 3/243 |
| 2019/0137353 A1 | 5/2019 | Cole | |

OTHER PUBLICATIONS

Lechevallier, "Conditions favouring coliform and HPC bacterial growth in drinking-water and on water contact surfaces," 2003 World Health Organization (WHO). Heterotrophic Plate Counts and Drinking-water Safety, pp. 178-197.

Bachner, "Piping for New Construction-Plastic vs. Copper," retrieved online [http://healthybuildingscience.com/2015/10/30/new-construction-piping-plastic-vs-copper/], on Jun. 22, 2018, 17 pages.

Connell et al., "PEX and PP Water Pipes: Assimilable Carbon, Chemicals, and Odors," American Water Works Association Journal, issued on Apr. 2016, vol. 108, No. 4, 1 page.

Notice of Allowance dated Feb. 28, 2020, for U.S. Appl. No. 16/424,725, 8 pages.

Non-Final Office Action dated Jun. 26, 2019, for U.S. Appl. No. 15/808,539, 9 pages.

Non-Final Office Action dated Sep. 28, 2018, for U.S. Appl. No. 15/589,497, 14 pages.

Notice of Allowance dated Mar. 1, 2019, for U.S. Appl. No. 15/589,497, 9 pages.

PCT International Search Report and Written Opinion dated Feb. 19, 2019, for PCT International Application No. PCT/US2018/059959, 14 pages.

PCT International Search Report and Written Opinion dated Jun. 1, 2018, for PCT International Application No. PCT/US2018/020439, 14 pages.

Non-Final Office Action dated Oct. 8, 2019, for U.S. Appl. No. 16/424,725, 11 pages.

Notice of Allowance dated Oct. 2, 2019, for U.S. Appl. No. 15/808,539, 6 pages.

Australian Notice of Acceptance dated Sep. 3, 2020, for Australian Patent Application No. 2018228866, 3 pages.

Australian Office Action dated Aug. 26, 2020, for Australian Patent Application No. 2018228866, 3 pages.

Australian Office Action dated Sep. 3, 2020, for Australian Patent Application No. 2018366259, 3 pages.

Notice of Acceptance dated Oct. 8, 2020, for Australian Patent Application No. 2018366259, 3 pages.

* cited by examiner

METHODS AND APPARATUS TO DETECT LEAKS BASED ON TEMPERATURE DATA

FIELD OF THE DISCLOSURE

This disclosure relates generally to utility delivery systems and, more particularly, to methods and apparatus to detect leaks based on temperature data.

BACKGROUND

Some known leak detection systems used in utility distribution systems (e.g., fluid utility distribution systems) employ leak detection sensors with acoustic sensors that detect noise and/or characteristic sounds, which may be indicative of a potential leak. In particular, these known leak detection sensors are usually coupled to a pipe and/or portion of a fluid delivery system, and utilize parameters, such as amplitude and/or a time-history of acoustic signals to determine a presence of a potential leak. However, use of these parameters can be inaccurate due to environmental noise, etc.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
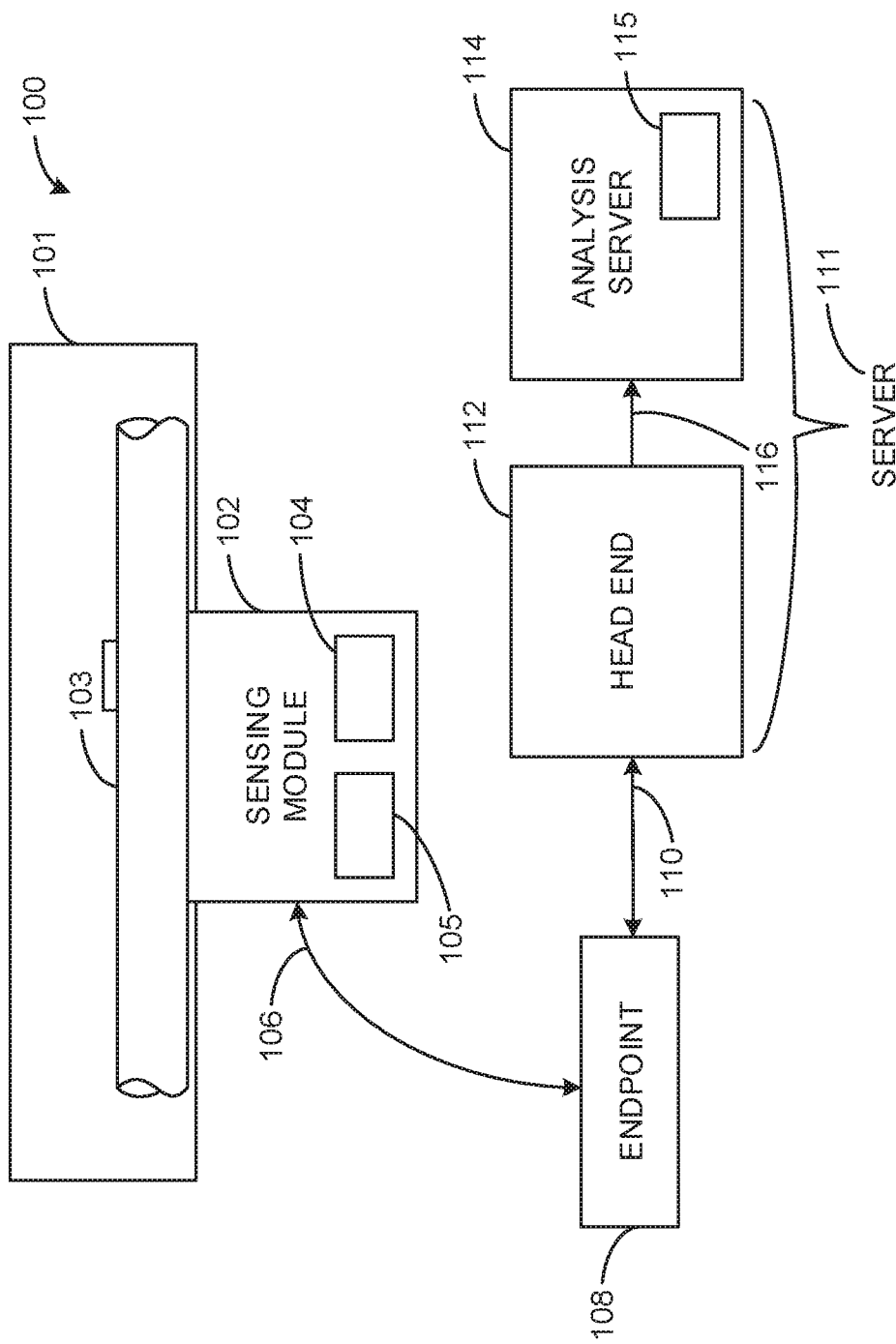
FIG. 1 is a schematic overview of an example utility measuring system in which the examples disclosed herein may be implemented.

Methods and apparatus to detect leaks base on temperature data are disclosed. Some leak detection systems employ leak detectors with acoustic sensors that detect noise and/or characteristic sounds, which may be indicative of a potential leak. However, with these known systems, determination of leaks and/or leak patterns can be difficult due to noise in the system, external noise, slow drift of leak patterns and/or irregular use (e.g., irregular or highly variable utility system usage, etc.).

The examples disclosed herein enable very accurate determination of system leak conditions and/or leak probabilities by removing uncertainty that is typically present in leak detection systems due to characteristic properties. These characteristic properties may pertain to environment, implementation and/or typical use (e.g., taking into account seasonal and/or daily variations, etc.). In particular, some of the examples disclosed herein provide an effective and accurate manner of determining leak conditions and/or a presence of a leak in fluid utility measuring systems by collecting numerous spectral recording measurements from sensors that are analyzed in conjunction with temperature data for leak analysis/determination. Some of the examples disclosed are capable of determining leak probabilities and/or leak likelihood primarily based on temperature measurements (e.g., independent of spectral recording data). Additionally or alternatively, consumption data is considered in leak determination/analysis.

The examples disclosed herein employ a leak analysis system and/or network of a utility delivery system that collects sensor data (e.g., acoustic sensor data), which may be spectral recordings (e.g., acoustic spectral recordings or data associated with the spectral recordings) from numerous pipe/joint acoustic sensors, as well as temperature data. As a result, random, environmental, usage and/or event-related noise to determine leak probabilities may be accounted for in the overall leak detection system by processing and/or sorting the spectral recordings based on the temperature data.

As used herein, the term "recording" or "spectral recording" refers to a measured or recorded signal, frequency domain signal or time-history that corresponds to a time period (e.g., a pre-defined recording time span). Accordingly, the terms "recording" or "spectral recording" may be stored temporarily (e.g., in random access memory) or in a tangible medium, and may be represented or characterized over a frequency domain, for example. As used herein, the term "spectral average" refers to an averaged signal waveform of multiple spectral recordings. As used herein, the term "temperature data" refers to temperature data, temperature changes, temperature shifts and/or measurements associated with temperature (e.g., weather) effects. Accordingly, the term "temperature data" can also encompass ambient room temperature, fluid temperature, weather, weather effects and/or ambient environmental conditions.

FIG. 1 is a schematic overview of an example utility measuring system (e.g., a leak probability analysis apparatus) 100 in which the examples disclosed herein may be implemented. According to the illustrated example of FIG. 1, the utility measuring system 100 is to characterize and/or monitor a condition of a utility distribution system (e.g., a utility fluid delivery system, a utility delivery subsystem, a utility delivery system, etc.) 101. The example utility measuring system 100 includes a remote sensor (e.g., a sensing module, a remote spectral analyzer, etc.) 102 that is coupled to a pipe 103 (of the utility distribution system 101) and includes an analysis module 104, a temperature sensor (e.g., a thermocouple, an infrared temperature sensor, etc.) 105 and a first bi-directional communication link 106 that communicatively couples the remote sensor 102 to an endpoint (e.g., a utility measuring endpoint, a communication endpoint, a utility endpoint, etc.) 108.

The example utility measuring system 100 also includes a second bi-directional communication link 110 that communicatively couples the endpoint 108 to a server (e.g., a central server, a data collection facility, etc.) 111. The example server 111 includes a head end (e.g., a server gateway, etc.) 112 and an analysis server (e.g., a remote backend server, a computation system, a computation cloud server, etc.) 114, both of which are coupled together via a connection 116, such as a file transfer protocol (FTP) in this example.

In this example, the first bi-directional communication link 106 is implemented as a wired cable and the second bi-directional communication link 110 is implemented as a radio frequency (RF) link. However, any appropriate communication link and/or server/network topographies may be utilized to implement (e.g., a wired or wireless implementation thereof) the communication connections/links 106, 110, 116 instead.

To characterize a condition (e.g., a baseline or current/operating condition) of the utility distribution system 101, the remote sensor 102 of the illustrated example utilizes an acoustic sensor to record or measure (e.g., acoustically measure) multiple recordings (e.g., time-domain recordings, frequency domain recordings) from a section or portion of the utility distribution system 101 to define a spectral average, for example. According to the illustrated example, the spectral average is generated based on converted and/or spectral representations of the spectral recordings. In this example, the remote sensor 102 obtains temperature readings (e.g., recorded/stored temperature readings) from the temperature sensor 105 to enable sorting, data processing and/or analysis of the spectral recordings. Additionally or alternatively, temperature and/or weather data is provided to (e.g., downloaded or imported at) the remote sensor 102 and/or the utility measuring system 100 via an external network. In particular, the temperature and/or weather data may be downloaded at the remote sensor 102 so that the remote sensor 102 can process the aforementioned spectral recordings based on the temperature and/or the weather data. In some examples, the server 111 processes the spectral recordings along with the weather data.

In some examples, the remote sensor 102 is coupled to the pipe 103 of the utility distribution system 101. According to the illustrated example, the analysis module 104 generates spectral recording data, such as spectral recording averages, based on temperature data-processed (e.g., sorted, weighted, modified, etc.) spectral recording data/information to determine an overall leak condition of the utility distribution system 101, for example.

In some examples, the analysis module 104 packages or encodes the temperature data-processed spectral recording data, spectral representations, other data associated the spectral recordings (e.g., occurrence, noise level, symbols, etc.) and/or spectral average(s) after temperature-processing into a data packet (e.g., for later transmission to the analysis server 114). In other words, the analysis module 104 of the illustrated example packages or encodes the spectral recording data into a data packet after the spectral recording data has been processed, modified and/or sorted based on temperature or weather data.

Additionally or alternatively, the analysis module 104 controls parameters of the remote sensor 102 based on current spectral recording measurements (e.g., a measured amplitude of a current recording), temperature data, or spectral averages. For example, the analysis module 104 may direct an increase or decrease of a polling frequency and/or control a power mode of the remote sensor 102 based on the measurements (e.g., an increased polling frequency based on a sudden increase in amplitude of the measurements). In some examples, temperature shifts and/or passing temperature thresholds (e.g., temperature extremes) of temperature measurements by the temperature sensor 105 causes changes in polling and/or an operating mode of the remote sensor 102.

To transmit the temperature-processed spectral recording data, the spectral representations, the spectral averages, analysis related to the spectral recording data (e.g., analysis performed by the analysis module 104) and/or determined condition(s) or leak probabilities to the example server 111 (e.g., to the analysis server 114 for later analysis), the remote sensor 102 transmits the aforementioned data packet to the endpoint 108 via the bi-directional communication link 106 and, in turn, the endpoint 108 transmits this data packet to the server 111 via the bi-directional communication link 110. In some examples, the head end 112 then forwards the data packet to the analysis server 114. In particular, the data packet may be utilized and/or analyzed at the analysis server 114, which may be located at a utility control center/facility, to convey a condition of an overall utility node/network and/or direct maintenance crews for repair work need, for example. In some examples, temperature analysis is performed by the analysis server 114.

In this example, the analysis server 114 is implemented on the server 111 to analyze the spectral recording data (e.g., the spectral recordings), corresponding temperature data, weather data and/or the spectral recording averages to determine a leak probability distribution of the utility distribution system 101. In some examples, operational functionality of and/or analysis that is at least partially performed by the analysis module 104 or the analysis server 114 is distributed across the remote sensor 102, the endpoint 108 and/or the server 111 (e.g., a distributed analysis/computation topography, e.g., a cloud-based analysis). Additionally or alternatively, in some examples, the endpoint 108 is integral with the remote sensor 102. In some examples, the remote sensor 102 includes circuitry to receive power from the endpoint 108 and/or other external device.

Figure 2:
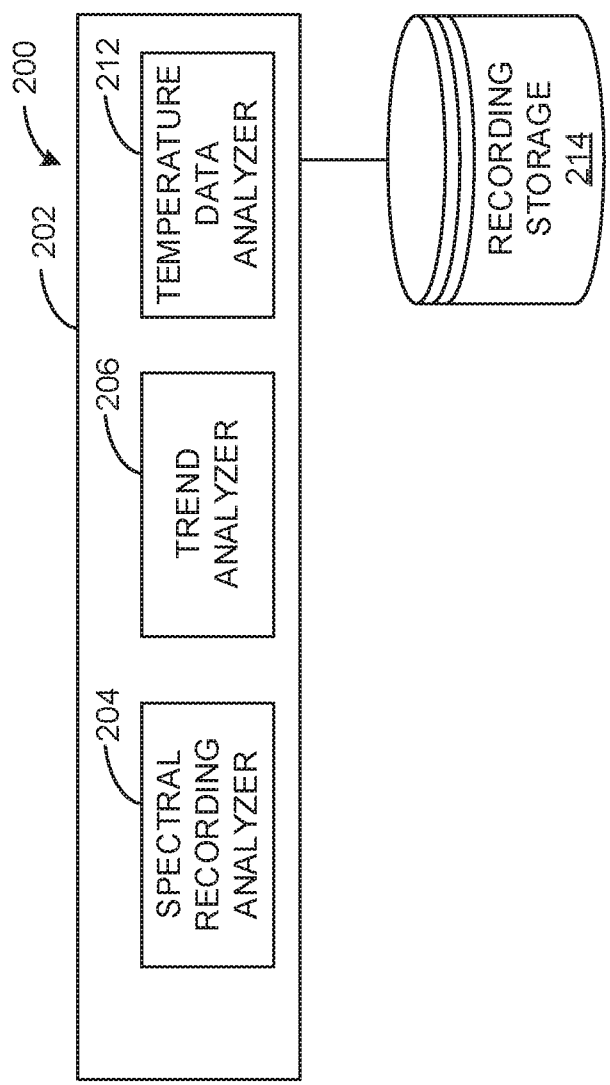
FIG. 2 illustrates an example leak probability analysis module that may be used to determine a leak condition based on sensor data.

FIG. 2 illustrates an example leak probability analysis module 200 that may be used to determine a leak condition or probabilistic distribution based on sensor data (e.g., spectral recording data) associated with at least one of the remote sensors 102. The example leak probability analysis module 200 may be implemented in the analysis server 114, the remote sensor 102 and/or the analysis module 104. The leak probability analysis module 200 of the illustrated example includes a leak computation module 202, which includes a spectral recording analyzer 204, a trend analyzer 206, and a temperature data analyzer 212. In this example, the leak probability analysis module 200 also includes a recording storage 214.

To direct collection of, characterize, analyze, maintain quality of spectral recordings used for analysis and/or sort spectral recordings measured at the remote sensors 102, the spectral recording analyzer 204 is used to determine a noise level and/or spectral energy of the spectral recordings and/or their associated spectral averages by utilizing temperature data associated with the remote sensor 102 in this example. In particular, the temperature data can be used to discard spectral recordings and/or provide weighting factors to the spectral recordings. Additionally or alternatively, the spectral recording analyzer 204 identifies peak movement(s) or shifts of the spectral recordings and/or compares the spectral recordings with known leak signatures.

In this example, the spectral recording analyzer 204 sorts out and/or selects (e.g., includes or excludes) the spectral recordings based on temperature data to maintain an average quality (e.g., lack of noise so that the spectral recordings can be analyzed). Additionally or alternatively, the spectral recording analyzer 204 and/or the temperature data analyzer 212 utilizes the temperature data to determine whether a leak is probable (e.g., likely). In such examples, this leak determination may be made independent of the spectral recordings. Additionally or alternatively, this leak determination is performed based on consumption data (e.g., a determined drop in consumption coinciding with temperature shifts). In some examples, the aforementioned consumption and temperature data is used to determine a theft or removal of the remote sensor 102.

To determine that at least one of the remote sensors 102 is trending away from a base line non-leak detection condition, the example trend analyzer 206 analyzes shifts or trends (e.g., temperature shifts or trends) in the remote sensors 102, temperature data from the temperature sensor 105, temperature shifts and/or a change in shape or peak centering of respective spectral recordings or spectral recording averages.

According to the illustrated example, the recording storage 214 stores spectral recording data, spectral recordings, spectral averages, temperature data, temperature history, weather data, seasonal pattern information (e.g., seasonal profiles, seasonal data, etc.), averaged spectral recording waveforms and/or leak probability indicators (e.g., indications of a potential leak) received from the remote sensor 102 via the endpoint 108 or the analysis server 114.

While an example manner of implementing the leak probability analysis module 200 of FIG. 2 is illustrated in FIG. 2, one or more of the elements, processes and/or devices illustrated in FIG. 2 may be combined, divided, re-arranged, omitted, eliminated and/or implemented in any other way. Further, the example leak computation module 202, the example spectral recording analyzer 204, the example trend analyzer 206, the example temperature data analyzer 212 and/or, more generally, the example leak probability analysis module 200 of FIG. 2 may be implemented by hardware, software, firmware and/or any combination of hardware, software and/or firmware. Thus, for example, any of the example leak computation module 202, the example spectral recording analyzer 204, the example trend analyzer 206 the example temperature data analyzer 212 and/or, more generally, the example leak probability analysis module 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example leak computation module 202, the example spectral recording analyzer 204, the example trend analyzer 206, and/or the example temperature data analyzer 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example leak probability analysis module 200 of FIG. 2 may include one or more elements, processes and/or devices in addition to, or instead of, those illustrated in FIG. 2, and/or may include more than one of any or all of the illustrated elements, processes and devices.

Figure 3:
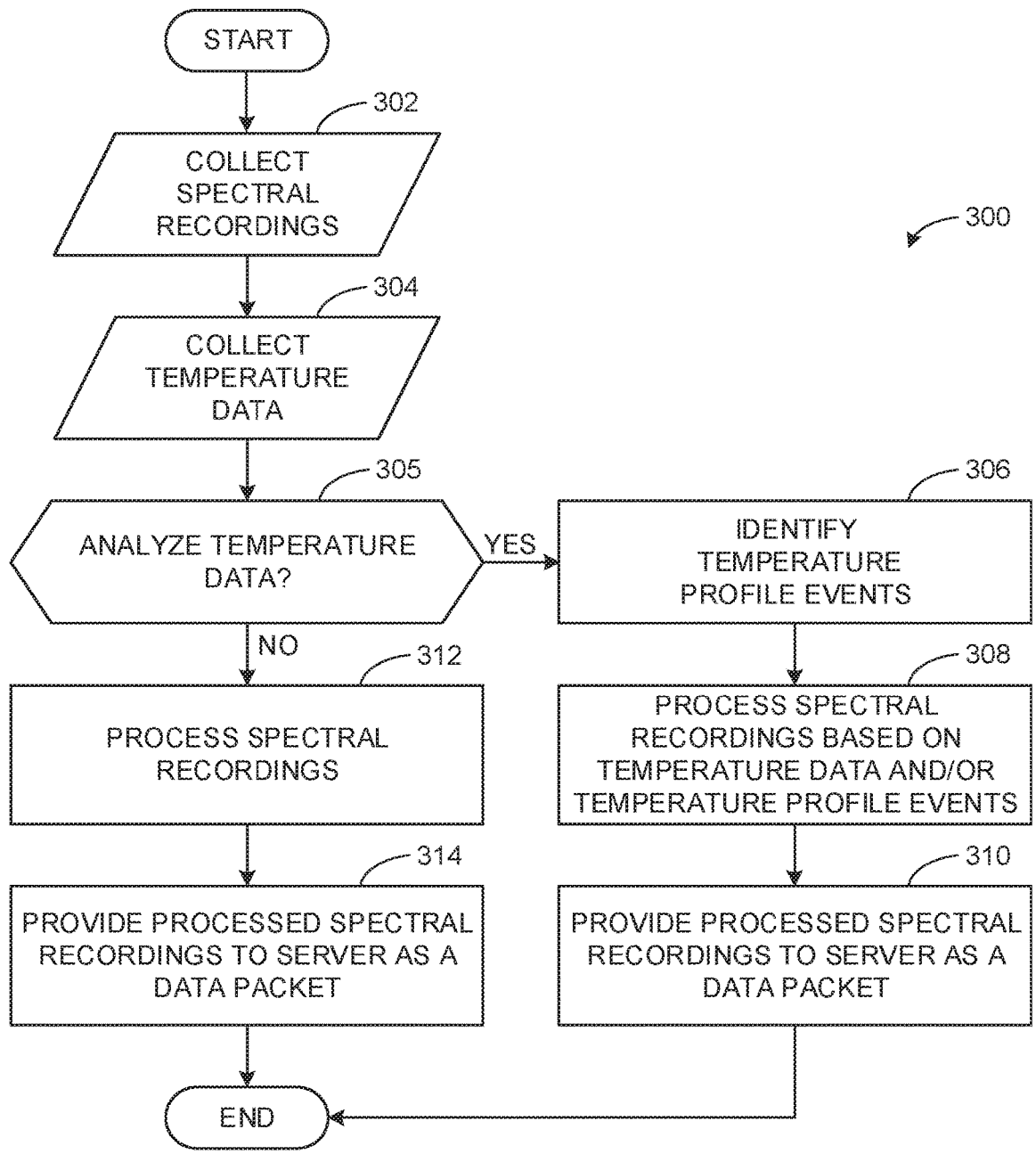
FIG. 3 is a flowchart representative of an example method in accordance with the teachings of this disclosure.

A flowchart representative of example machine readable instructions for implementing the leak probability analysis module 200 of FIG. 2 is shown in FIG. 3. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 3 many other methods of implementing the example leak probability analysis module 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Turning to FIG. 3, an example method 300 is used to generate temperature data-processed spectral recording data that is used to indicate a shift in a characteristic waveform pattern (e.g., waveform shape changes of spectral recording patterns observed, etc.), thereby facilitating leak detection sensing of each of the remote sensors 102 and/or the overall utility distribution system 101. According to the illustrated example, the method 300 begins as at least one of the remote sensors 102 is used to generate spectral recording data, which may include spectral recordings and/or spectral recording patterns that are tallied and monitored for significant changes.

According to the illustrated example, acoustic readings and/or spectral recordings are collected/measured by the sensor 102 (block 302). In particular, the sensor 102 obtains spectral recordings, such as those shown below in connection with FIG. 4, to be stored in the recording storage 214. Example spectral recording sessions are described below in connection with FIG. 5.

Next, the temperature data/readings are collected by the temperature sensor 105 (block 304). In particular, the temperature sensor 105 of the illustrated example measures temperature data (e.g., fluid temperature data over time, ambient temperature data over time, etc.) that is associated with (e.g., timed with) spectral recording data (e.g., spectral recordings). In other examples, weather data is imported by the remote sensor 102 (e.g., via a network and/or the remote server 111). Additionally or alternatively, historical data and/or seasonal pattern data is imported by the remote sensor 102.

According to the illustrated example, it is determined by the spectral recording analyzer 204 and/or the trend analyzer 206 whether temperature data is to be used to process the spectral recordings (block 305). If temperature data is to be taken into account (block 305), control of the process proceeds to block 306. Otherwise, control of the process proceeds to block 312. In some examples, this determination is based on whether the temperature data indicates a significant shift and/or movement past a threshold (e.g., a temperature threshold, a temperature difference threshold, etc.).

In some examples, temperature profile event(s) are identified based on the aforementioned temperature data (block 306). In particular, the temperature data analyzer 212 determines whether the temperature data indicates an existence of a temperature profile event by analyzing temperature readings of the temperature data, which may be out of threshold range(s). Additionally or alternatively, rapid shifts in the temperature data may indicate a temperature profile event.

According to the illustrated example, the acoustic spectral recordings are processed by the spectral recording analyzer 204 based on temperature data and/or any identified temperature profile events (block 308). In this example, at least a portion of the acoustic spectral recordings are selected and/or sorted (e.g., some of the spectral recordings are discarded or ignored) based on the temperature data. In some examples, spectral recordings are selected by excluding spectral recordings associated with outliers or anomalies in the temperature data. In other examples, spectral recordings are selected by including spectral recordings deemed to be of interest based on the temperature data. As a result of the selecting/sorting the spectral recordings, the spectral recordings are ensured to have sufficient quality (e.g., a lack of noise, etc.) to accurately indicate system condition(s) and/or properly characterize their associated remote sensor 102. Once a portion of the spectral recording data is selected (e.g., either excluding or including, as appropriate), the portion is generated for transmission to the server 111.

Next, in some examples, acoustic spectral recordings are transmitted to the server 111 (e.g., via a transceiver) as a generated data packet (block 310). In some examples, the temperature data, analysis associated with the temperature data and/or a determined temperature profile event are also encoded into the packet.

Additionally or alternatively, the temperature data (e.g., changes or shifts in the temperature data) causes spectral recordings to be obtained and/or triggers an analysis of the spectral recordings. For example, a temperature measurement below a low temperature threshold (e.g., a low temperature extreme) or a temperature measurement above a high temperature threshold (e.g., a high temperature extreme) may indicate a probability of a leak and, thus, cause an alert to be transmitted and/or cause associated spectral recordings associated with passing either of the aforementioned thresholds (high or low) to be packaged into a data packet for transmission to the server 111.

In examples where the temperature data is not to be analyzed (block 305), acoustic readings are processed without the temperature data (block 312).

Next, the processed spectral recordings/acoustic readings are packaged into a data packet and provided/transmitted to the server 111 (block 314). In some examples, temperature data is also provided with the spectral recordings and encoded to the data packet.

Figure 4:
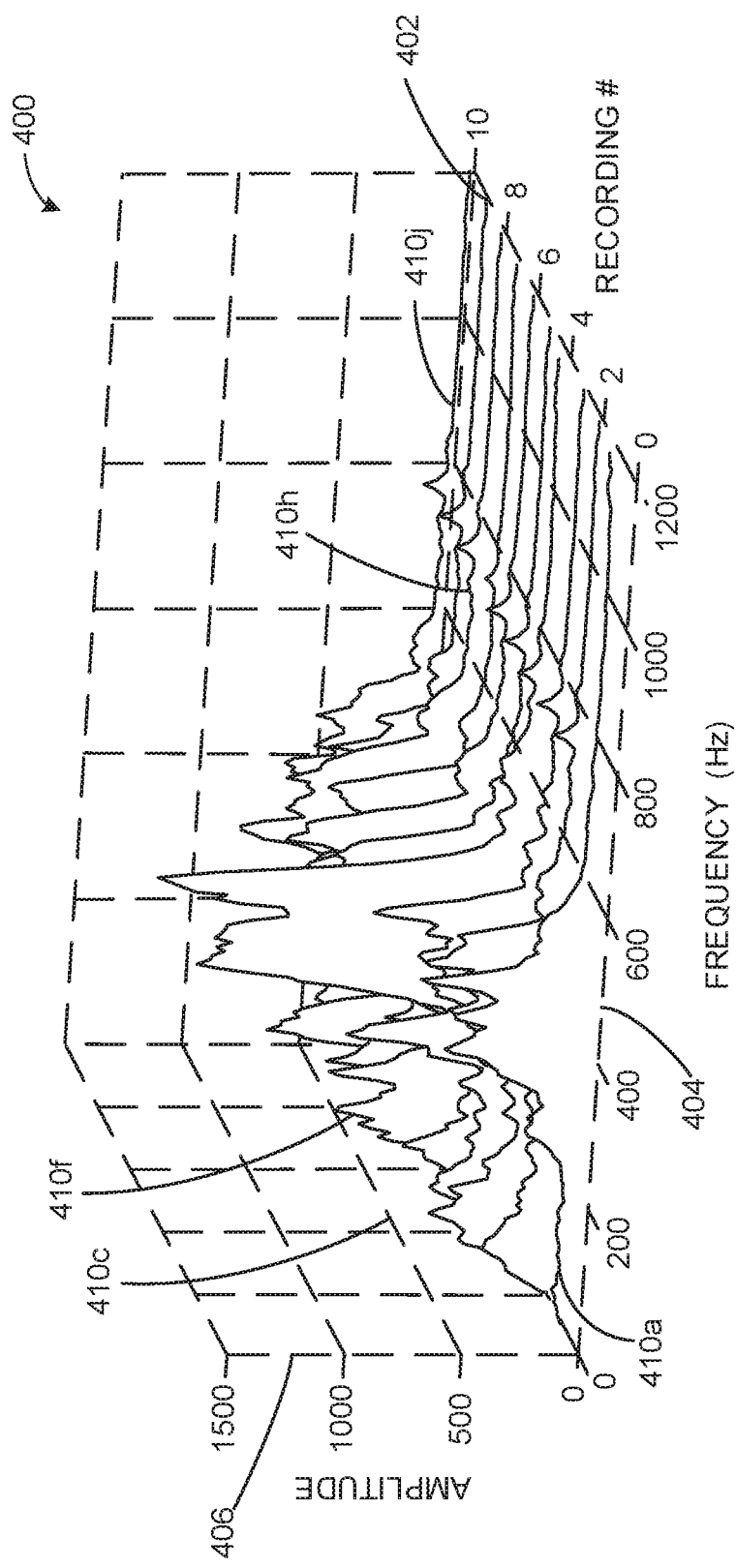
FIG. 4 is a plot depicting example spectral recordings during a single recording session.

FIG. 4 is a graph 400 depicting example spectral recordings/averages associated with the remote sensor 102 during a single recording session. The graph 400 includes a first axis 402 pertaining to spectral recording numbers (e.g., interval spectral recording numbers, time interval spectral recording numbers), a second axis 404 pertaining to frequency in hertz (Hz) and a third axis 406 pertaining to an amplitude of the spectral recordings/averages. Accordingly, spectral recording waveforms or spectral recordings 410 (hereinafter 410a-410j) are also shown in the graph 400.

In operation, high resolution data analysis of the remote sensor 102 may be performed on the spectral recordings 410 during or after a recording session. In particular, each of the spectral recordings 410 measured at the remote sensor 102 are captured/detected and classified as noise signatures, which may be later transmitted as symbols or pattern numbers, for example. In some examples, a lookup database may be used to make a determination of a degree to which the spectral recordings 410 correlate to a known noise signature (e.g., a known mains hum or a leak signature, etc.). As a result, a symbol (a value from 1:n) that indexes the noise signature can be sent in conjunction with a confidence level that indicates how well the individual spectral recording 410 correlates and/or exhibits similarity to a database signature (e.g., a correlation analysis).

In some examples, the spectral recordings are discarded or weighted based on correlated temperature data and/or temperature profile events. In particular, some of the spectral recordings may be discarded based on temperature data. Additionally or alternatively, spectral recordings are weighted based on the temperature data and/or temperature profile event(s).

In some examples, quality of the spectral recordings 410 are analyzed (e.g., low quality spectral recordings 410 are disregarded or discarded, etc.) by the analysis module 104. For example, the overall spectral envelope may be taken and compared to the individual spectral recordings 410 (e.g., a correlation, a coherence, a standard deviation, etc.). Additionally or alternatively, a degree to which each of the spectral recordings 410 during the session compares to the respective previous recording 410 is analyzed (e.g., analyzed on a quantified basis, a correlation analysis, a degree of change analysis, etc.). Additionally or alternatively, only certain frequency ranges of the spectral recordings 410 are analyzed (i.e., spectral frequency ranges are truncated) based on relevance.

In some examples, data pertaining to the spectral recordings 410 is compressed (e.g., for later transmission). For example, if transmission of such data is bandwidth limited, frequency range and signal amplitude may be compressed instead of sending the complete spectral recording 410 from the remote sensor 102 to the server 111.

Figure 5:
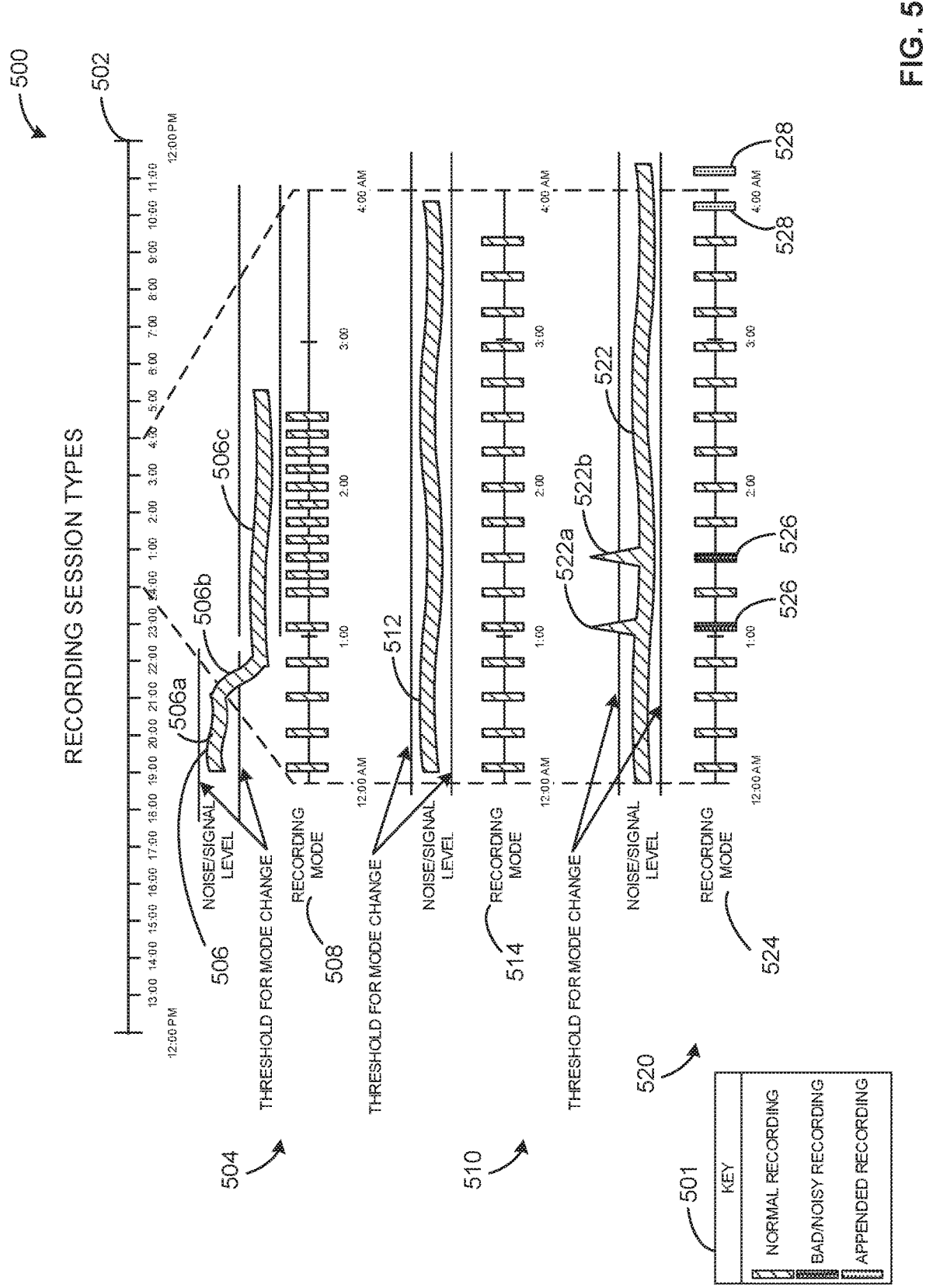
FIG. 5 is a plot representing example signal acquisition and analysis to select and/or obtain spectral recordings at a remote sensor of the example utility measuring system of FIG. 1.

FIG. 5 is a plot 500 representing example signal acquisition and analysis to select and/or obtain spectral recordings from the remote sensor 102 to define spectral averages. In this particular example, adaptive sampling is performed on the spectral recordings by the remote sensor 102 to enable the example analysis module 104 to generate a spectral average(s) (e.g., a spectral noise signature, and/or a spectral average). In the view of FIG. 5, a legend 501 representing signal recording classifications and a time scale 502 representing a time of day are shown.

According to the illustrated example, a first example recording session 504 is shown over a portion of the time scale 502. A signal plot (e.g., a measured plot, a measured recording, a recorded section, etc.) 506 of recording measurements is characterized by its regions or portions 506*a*, 506*b* and 506*c*. In the region 506*a*, the signal plot 506 exhibits relatively flat behavior. As can be seen in the region 506*b* of FIG. 5, the signal plot 506 decreases and crosses a threshold (e.g., a set point) and/or threshold range, and generally levels out and/or flattens along the region 506*c*. Accordingly, a corresponding recording mode 508 shows an increase in polling of the sensor 102 (e.g., an increased data acquisition rate of the sensor 102) based on a transition from the region 506*b* to the region 506*c*, for example. In this particular example, an amplitude above a threshold level triggers a recording session to begin and subsequent movement across one or more thresholds causes a polling rate to vary.

A second example recording session 510 involves a signal plot 512 remaining within a threshold range and, in turn, a polling frequency shown in a corresponding recording mode 514 does not change, in contrast to the example recording session 504. In this example, approximately 10-20 recordings (e.g., sixteen recordings) are needed to develop the spectral average and/or noise profile. However, any appropriate number of samples may be used since the appropriate number of recordings can be dependent on application or use.

A third example recording session 520 shows a signal plot 522 having corresponding noisy regions 522*a* and 522*b*. In this example, a corresponding recording mode 524 indicates noisy recordings 526, both of which are discarded/rejected (e.g., the noisy recordings 526 exceed a noise level threshold). Accordingly, to obtain a proper number of recordings in this example, the sensor 102 is directed to measure and/or append recordings 528 based on the deletion of the noisy recordings 526.

In some examples, a recording session to collect/measure spectral recordings is initiated based on a measured amplitude exceeding a threshold (e.g., an absolute peak amplitude in the time domain may be utilized). In some examples, when periods pertaining to relatively low amplitude measurements (e.g., quiet periods) are subsequently followed up with a relatively large amplitude signal, a recording session is initiated.

In some examples, if a recording session ends up noisy and/or faulty (e.g., the recordings 526), configuration data and/or operating parameters of the sensor 102 (shown in FIG. 1) may be adjusted by the analysis module 104 to increase a probability of less-noisy signals measured at the sensor 102, for example. In some examples, indication of a faulty recording session and/or incomplete recording data (e.g., a lower number of recordings than a requisite number, a disconnect, etc.) may trigger a bias flag to be transmitted (e.g., added or encoded to a data packet that is transmitted).

In some examples, if a recording session is successful, the associated data and/or recording session data is converted to and/or analyzed within the frequency domain to define at least one spectral representation. Additionally or alternatively, associated spectral energy is examined and may be weighted to an array of the following values: [−1 0 1], for example. In particular, for the spectral energy measurements with central tendencies (e.g., falling within expected statistical bounds), the corresponding spectral representation and/or recording is given a weighting value close to 0 (e.g., a value of 0). Accordingly, higher spectral energy recordings and/or corresponding spectral representations may be weighted with a positive value while, in contrast, lower spectral energy recordings and/or corresponding spectral representations may be weighted with a negative value.

In some examples, root-mean-square (rms) data associated with the recordings is analyzed and/or examined. In such examples, if the rms variance is low, a minimal change in signal amplitude may be determined. Additionally or alternatively, summing a combination of spectral weighting as well as rms variance may indicate a value indicating data fit quality (e.g., a "goodness" of fit).

In some examples, recording times and/or time period(s) of the day to record are selected based on a time of day, one or more previous recordings and/or one or more previously generated spectral representations. In such examples, the selected recording times (e.g., time of day) may be transmitted to an external device (e.g., so that the external device may trigger the leak detection sensor 102 to turn on).

Any aspect described above with respect to any of the example recording sessions 504, 510 and 520 may be used in collecting recordings and/or developing spectral representations to generate spectral averages that pertain to a baseline (e.g., a known condition) spectral average or a new/current spectral average (e.g., today's spectral average from 2 am to 4 am, etc.)

In some examples, fault-indicating recordings indicating abnormal operation, improper installation and/or misplacement of the sensor 102 trigger a warning and/or flag to indicate that the recording obtained are faulty and/or may result in generation of faulty spectral recordings, representations and/or averages. Additionally or alternatively, these fault indicating recordings may trigger a reset of the sensor 102. Any of the examples described above in connection with FIG. 5 may be adjusted based on temperature data and/or a temperature profile event.

Figure 6A:
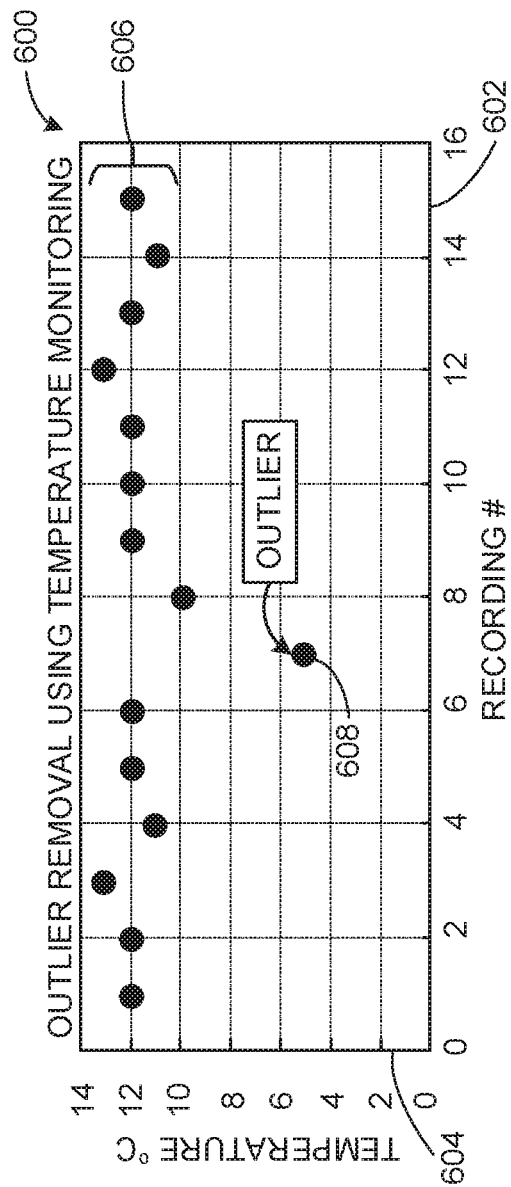
FIGS. 6A and 6B depict example temperature monitoring in accordance with the teachings of this disclosure.
Figure 6B:
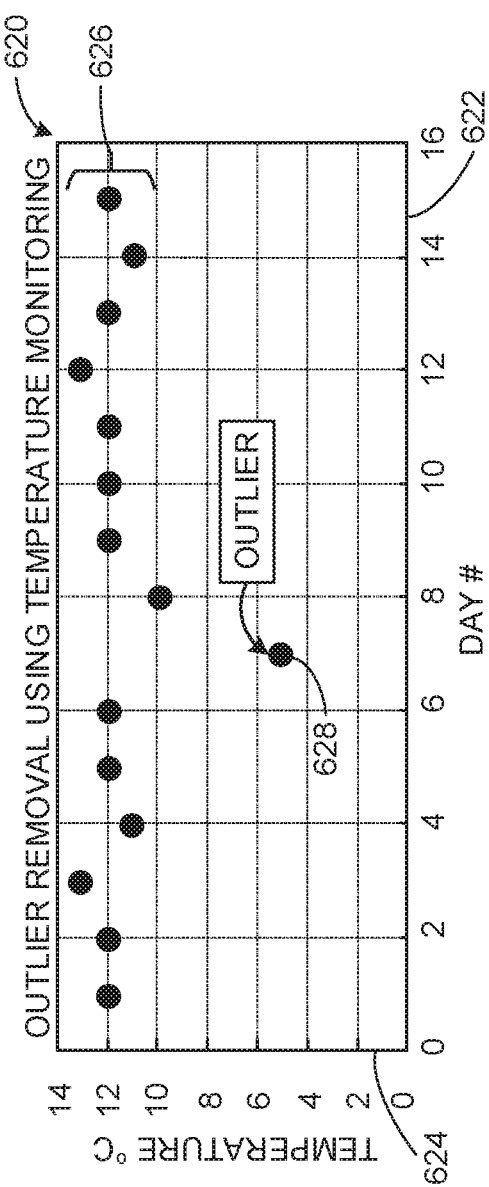

FIGS. 6A and 6B depict example temperature monitoring in accordance with the teachings of this disclosure. Turning to FIG. 6A, a graph 600 includes a horizontal axis 602 representing successive recording numbers and a vertical axis 604 representing temperatures (in degrees Celsius) measured at the temperature sensor 105. In this example, leak detection occurs over several hours (e.g., a recording session defined by several hours).

According to the illustrated example of FIG. 6A. many of the data points 606, which correspond to respective spectral recordings, fit within a band at approximately 10-14 degrees Celsius. However, an outlier 608 is also depicted in this example. In this example, spectral recording data associated with the outlier 608 is discarded and/or ignored in characterizing a condition of the utility distribution system 101. In particular, the outlier 608 differs from the data points 606 significantly enough so that any spectral recording(s) associated with the outlier 608 are removed.

In some examples, the spectral recordings associated with the outlier 608 are flagged as suspicious instead of being discarded or ignored. In other examples, a shift (e.g., a rapid shift) of temperature causes associated spectral recordings to be highlighted or flagged for analysis instead of being ignored or discarded.

FIG. 6B depicts a graph 620 that is similar to graph 600 of FIG. 6A, but instead depicts a relatively longer period of time. In particular, the graph 620 depicts several days instead of hours. The graph 620 includes a horizontal axis 622 that represents days (e.g., number of days). In this example, data points 626 generally correlate with one another while an outlier 628 does not correlate with the data points 626. Accordingly, spectral recordings and/or associated data of outlier 628 are ignored, discarded and/or flagged as suspicious.

Figure 7:
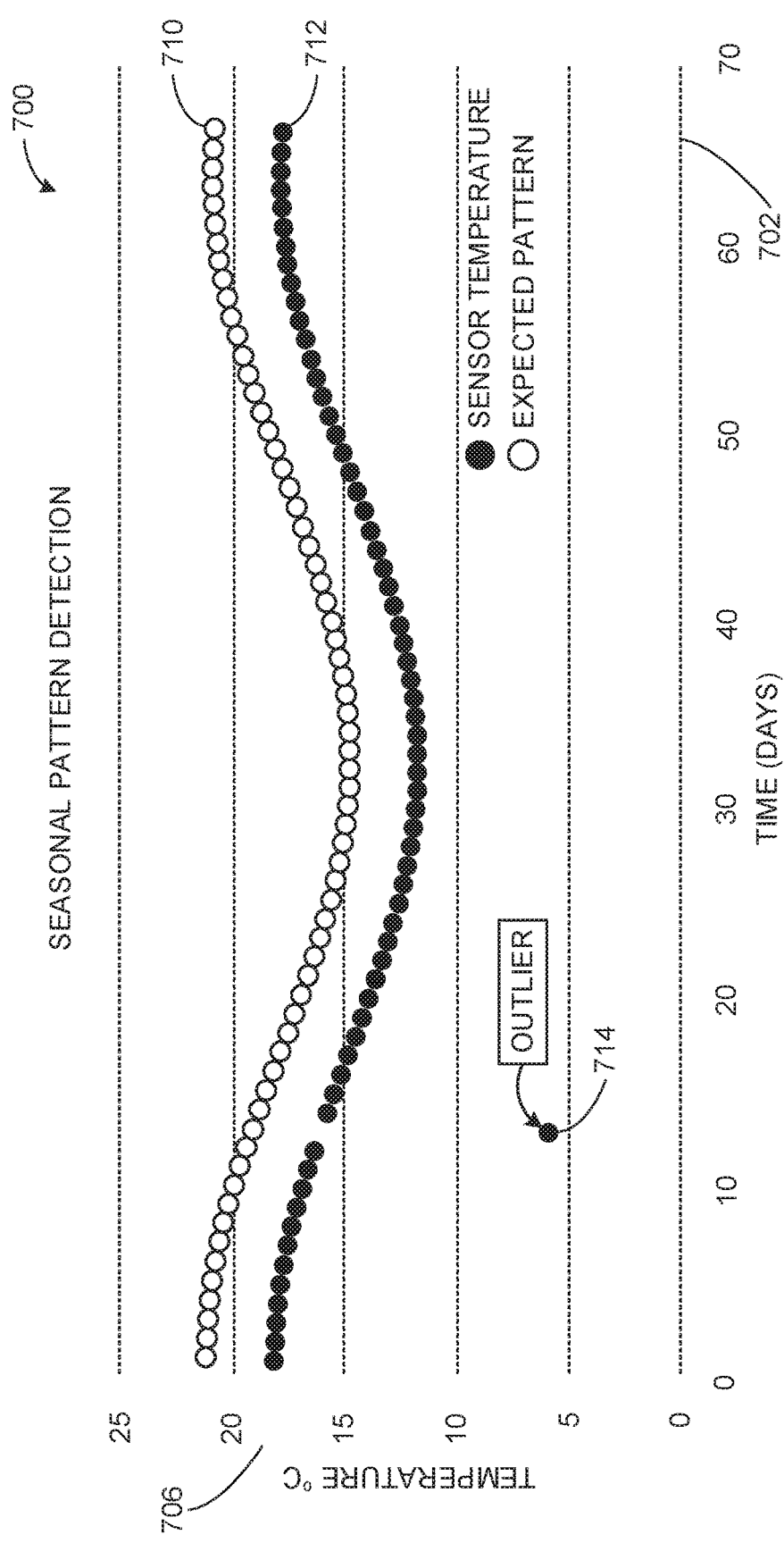
FIG. 7 is a plot representing seasonal pattern recognition that may be implemented in the examples disclosed herein.

FIG. 7 is an example plot 700 that illustrates how tracking seasonal temperature patterns (e.g., seasonal profiles, seasonal profile data) may be used in the examples disclosed herein to indicate a potential leak condition, cause spectral recording data to be discarded/ignored, cause spectral recording data to be analyzed/transmitted and/or may be used to cause additional data (e.g., spectral recording data, temperature data, weather data, etc.) to be taken. The example plot 700 includes a horizontal axis 702 that corresponds to time (in days) and a vertical axis 706 that corresponds to temperature. A first band 710 pertains to expected temperature patterns while a second band 712 pertains to temperatures measured by the temperature sensor 105.

According to the illustrated example, when an outlier 714 pertaining to the second band 712 is encountered, corresponding spectral recordings associated with the outlier 714 are thereby discarded or ignored. In some examples, a sudden shift of the second band 712 relative to the first band 710 may indicate a stationary signal and/or a possible leak (e.g., a significant decrease in temperature due to a reduction of fluids moving through a pipe of the utility distribution system 101). Alternatively, in some examples, if the second band 712 is increasingly diverging from the first band 710, a possible leak signature may be indicated.

In some examples, shifts in the overall shape of the second band 712 relative to the first band 710 are used to determine possible outliers and/or possible leaks. In some examples, a certain number of outliers over a time period (e.g., a density of outliers) are used to determine whether the outliers are increasing over time, which may indicate a long-term developing leak (e.g., a slow leak).

Figure 8:
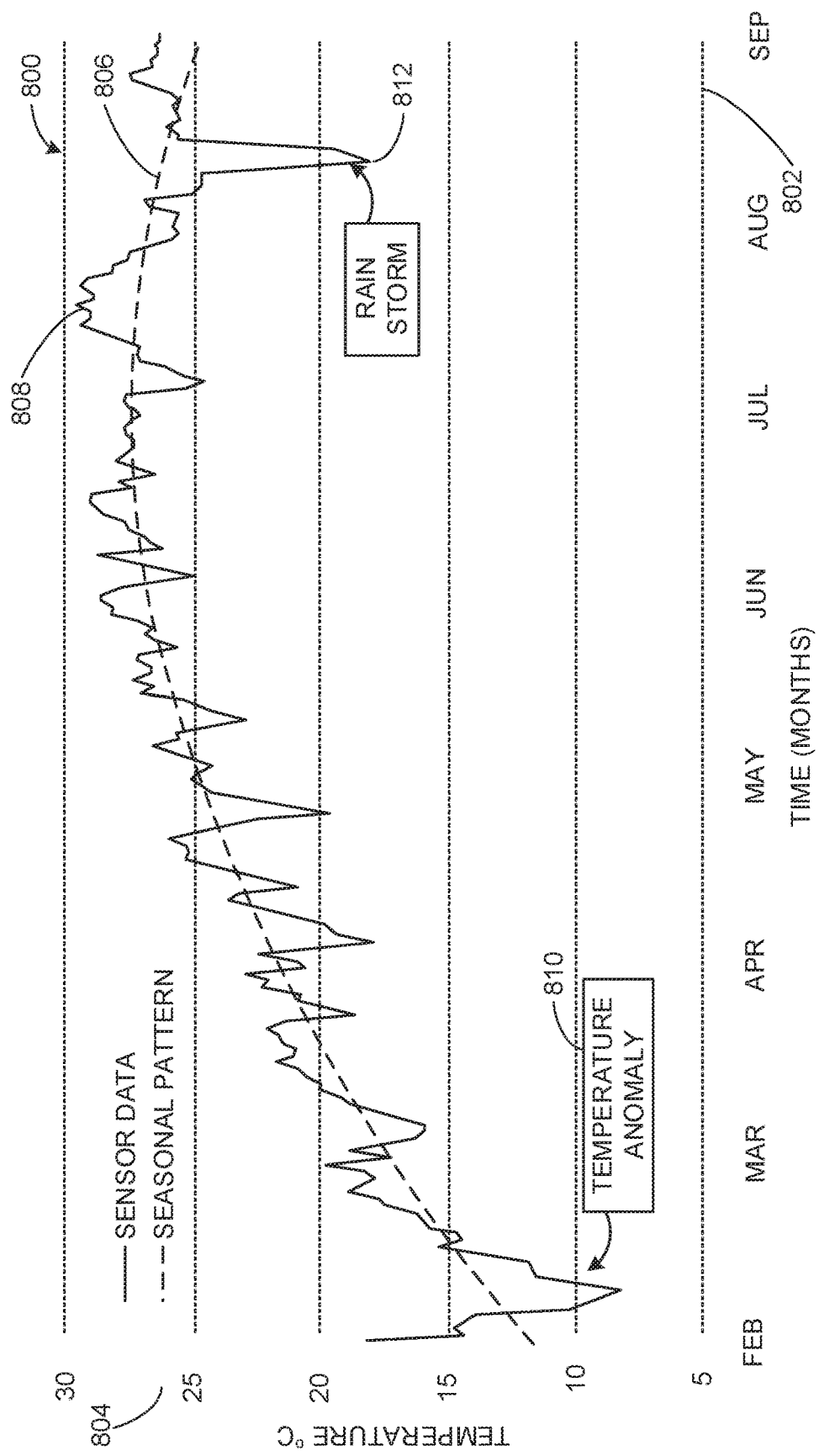
FIG. 8 is an example plot illustrating an example analysis of seasonal data with events that may be implemented in the examples disclosed.

FIG. 8 is an example plot 800 illustrating an example analysis of seasonal data with events that may be implemented with the examples disclosed herein. The example plot 800 includes a horizontal axis 802 representing time (in months) and a vertical axis 804 representing temperature. As can be seen in FIG. 8, a curve 806 represents an expected seasonal temperature pattern and a curve 808 represents temperature data measured at the temperature sensor 105.

According to the illustrated example, a temperature anomaly portion 810 and a rain storm portion 812, both of which include temperature dips associated with their events. In this example, spectral recordings associated with the portions 810 and 812 are disregarded by ignoring or discarding spectral recordings recorded during the portions 810 and 812. Additionally or alternatively, in some examples, the portion 810 and/or the portion 812 may indicate a potential leak. In other words, the temperature drops can be associated with leaks that occurred during the aforementioned temperature anomaly or the rainstorm. In these examples, temperature changes or shifts can be used by the temperature data analyzer 212 to determine a leak. For example, if a temperature is higher than typical (e.g., higher than average historical temperatures), a dry pipe or pipe having reduced or no fluid (e.g., water) may be indicated. As a result, the remote sensor 102 sends an alert to the remote server 111, in some examples.

Figure 9:
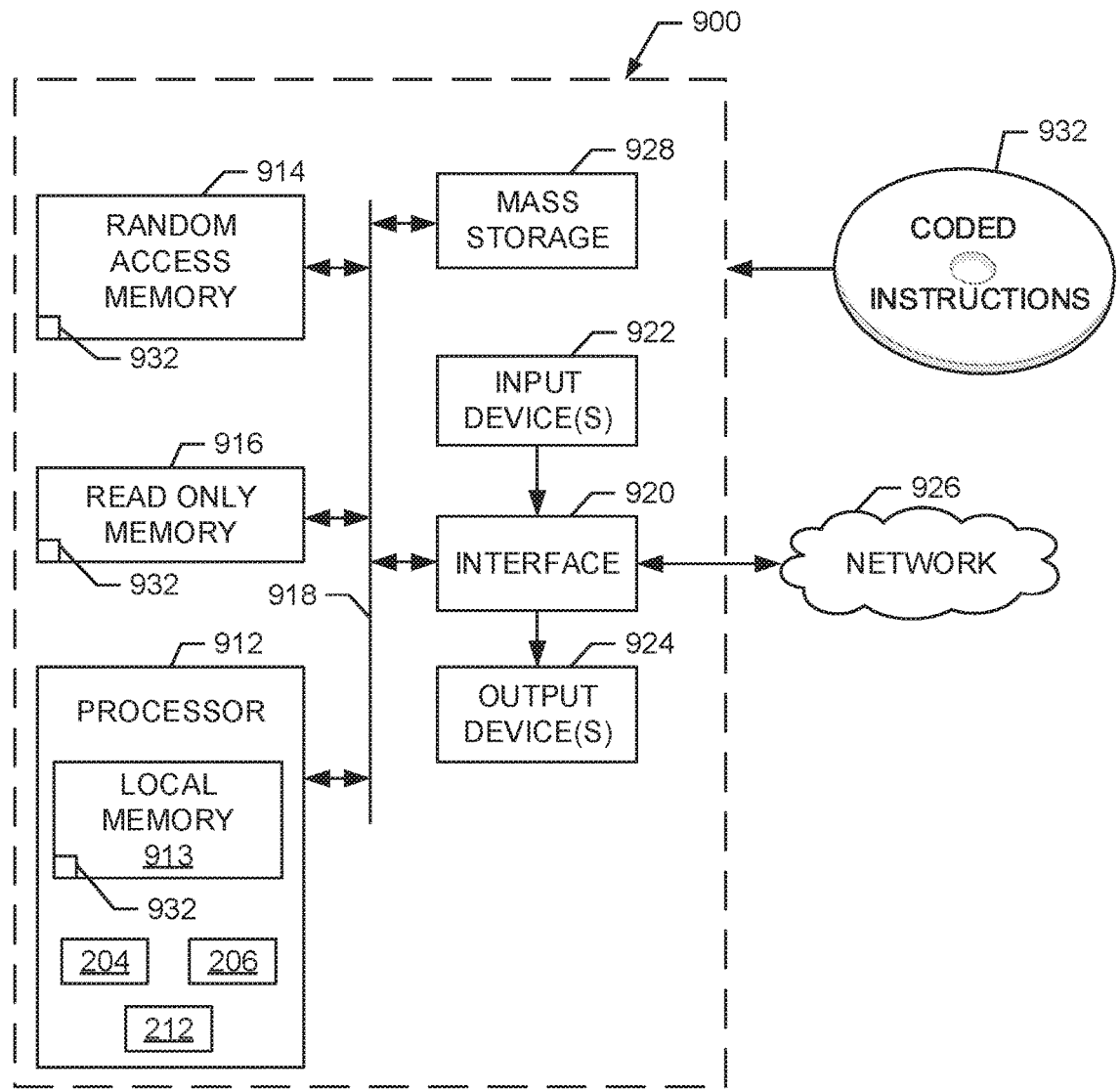
FIG. 9 is a processor platform that may be used to execute the example instructions of FIG. 3 to implement the example leak probability analysis module 200 of FIG. 2.

FIG. 9 is a block diagram of an example processor platform 900 capable of executing the instructions of FIG. 3 to implement the leak probability analysis module 200 of FIG. 2. The processor platform 900 can be, for example, a server, a personal computer, a mobile device (e.g., a cell phone, a smart phone, a tablet such as an iPad), a personal digital assistant (PDA), a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the spectral recording analyzer 204, the trend analyzer 206 and the temperature data analyzer 212.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 3 may be stored in the mass storage device 928, in the volatile memory 914, in the non-volatile memory 916, and/or on a removable tangible computer readable storage medium such as a CD or DVD.

From the foregoing, it will be appreciated that example methods and apparatus have been disclosed that can effectively generate information sensor data and observe shifts in leak-indicating spectral recording data and/or trends to determine a potential leak (e.g., a slow leak) of a utility distribution system based on temperature and/or weather data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to utility distribution systems, the examples disclosed herein may be applied to any appropriate waveform analysis application.

What is claimed is:

1. An apparatus comprising:
   a storage device;
   a transceiver for electronically transmitting and receiving data; and
   a processor communicatively coupled with the storage device and the transceiver, the processor configured to:
   obtain spectral recording data associated with spectral recordings over time from an acoustic sensor of a node of a fluid distribution system, the acoustic sensor communicatively coupled with the processor;
   obtain temperature data associated with the fluid distribution system;
   store the spectral recording data and the temperature data in the storage device;
   analyze the spectral recording data and the temperature data;
   select a portion of the spectral recording data based on the temperature data to minimize or eliminate noise in order to maintain quality of the spectral recording data to be processed further;
   generate a data packet based on the selected portion; and
   transmit, via the transceiver, the generated data packet including the selected portion to a server to determine a presence of a fluid leak based on the generated data packet including the selected portion.

2. The apparatus as defined in claim 1, wherein selecting the portion includes varying an analysis of the spectral recording data based on the temperature data to select the portion.

3. The apparatus as defined in claim 2, wherein varying the analysis includes varying the analysis of the spectral recording data based on identifying a temperature profile event.

4. The apparatus as defined in claim 1, wherein the processor is to further determine a shift in the temperature data to determine the presence of the fluid leak.

5. The apparatus as defined in claim 1, wherein the spectral recording data includes acoustic spectral recordings.

6. The apparatus as defined in claim 1, wherein selecting the portion includes disregarding spectral recordings associated with an anomaly or outlier of the temperature data.

7. The apparatus as defined in claim 1, wherein the transceiver is to import weather data to the node, and wherein the portion is selected further based on the weather data.

8. The apparatus as defined in claim 1, wherein a polling frequency of the spectral recording data is changed based on the temperature data.

9. The apparatus as defined in claim 1, wherein selecting the portion includes weighting the spectral recordings based on the temperature data.

10. The apparatus as defined in claim 1, wherein the processor is further configured to determine the presence of the fluid leak based at least in part on the generated data packet being transmitted.

11. The apparatus as defined in claim 10, wherein the processor is further configured to, based at least in part on determining the presence of the fluid leak, cause repair of the fluid leak.

12. A method comprising:
   recording, into a storage device by a processor, spectral recording data associated with spectral recordings over time collected from an acoustic sensor of a node of a fluid delivery system;
   recording, into the storage device by the processor, measured temperature data associated with the node;
   analyzing, by the processor, the spectral recording data and the temperature data;
   selecting, by the processor, a portion of the spectral recording data based on the temperature data to minimize or eliminate noise in order to maintain quality of the spectral recording data to be processed further;
   generating, by the processor, a data packet based on the selected portion; and
   transmitting the generated data packet, via a transceiver communicatively coupled with the processer, to a server for determining a presence of a fluid leak based on the generated data packet including the selected portion.

13. The method as defined in claim 12, further comprising determining a probability of the fluid leak based on the temperature data.

14. The method as defined in claim 12, wherein selecting the portion includes varying an analysis of the spectral recording data based on the temperature data to select the portion.

15. The method as defined in claim 14, wherein varying the analysis includes identifying a temperature profile event.

16. The method as defined in claim 12, further including importing weather data, wherein selecting the portion is further based on weather data.

17. The method as defined in claim 12, wherein selecting the portion is further based on seasonal pattern data.

18. The method as defined in claim 12, wherein selecting the portion includes disregarding spectral recordings associated with an outlier or an anomaly of the temperature data.

19. A non-transitory tangible machine readable medium comprising instructions, which when executed by a processor, cause the processor to at least:
   collect and store, in a storage device communicatively coupled with the processor, spectral recordings measured over time at a sensor of a node of a fluid distribution system, the sensor communicatively coupled with the processor;
   obtain and store temperature data associated with the fluid distribution system;
   analyze spectral recording data associated with the spectral recordings based on the temperature data;
   select a portion of the spectral recording data based on the temperature data to minimize or eliminate noise in order to maintain quality of the spectral recording data to be processed further;
   generate a data packet based on the selected portion; and
   transmit the generated data packet, by a transceiver communicatively coupled with the processor and over a network, to a remote server that determines a presence of a fluid leak based on the generated data packet including the selected portion.

20. The non-transitory tangible machine readable medium as defined in claim 19, wherein selecting the portion includes varying an analysis of the temperature data to select the portion.

21. The non-transitory tangible machine readable medium as defined in claim 19, wherein the instructions cause the processor to determine the presence of the fluid leak based on the temperature data.

22. The non-transitory tangible machine readable medium as defined in claim 19, wherein selecting the portion includes selecting the portion based on a temperature measurement of the temperature data passing a temperature threshold.

23. The non-transitory tangible machine readable medium as defined in claim 19, wherein selecting the portion includes selecting the portion based on an outlier or an anomaly of the temperature data.

24. The non-transitory tangible machine readable medium as defined in claim 23, wherein the portion includes spectral recordings associated with the anomaly or the outlier.

\* \* \* \* \*